May 7, 1929.  R. E. WARREN ET AL  1,711,761
UNION
Filed Sept. 19, 1922

Inventors
Roy E. Warren
Fred Mecott
By Heardway Rath
Attorneys

Patented May 7, 1929.

1,711,761

UNITED STATES PATENT OFFICE.

ROY E. WARREN AND FRED MELOTT, OF HOUSTON, TEXAS.

UNION.

Application filed September 19, 1922. Serial No. 589,274.

This invention relates to new and useful improvements in a union for metallic tubes.

One object of the invention is to provide a union of the character described which will permit the connected tubes to swivel, one with relation to the other and which, at the same time will provide a steam tight or water tight joint.

Another object of the invention is to provide a union of the character described which is of very simple construction, which may be readily assembled or taken apart and which at the same time will prevent the escape of water or steam through the joint.

With the above and other objects in view the invention has particular relation to certain novel features of construction, operation, and arrangement of parts, an example of which is given in this specification and illustrated in the accompanying drawing, wherein:—

Figure 1:
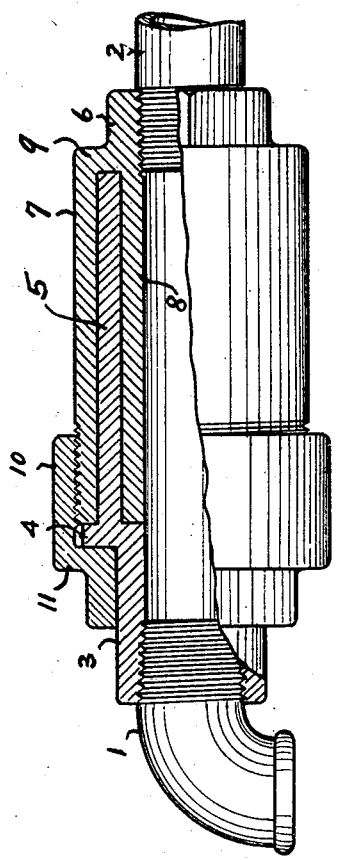
Figure 1 shows a side view of the union partly in section.

In the drawings, the numerals 1 and 2 designate tubular members to be connected in such manner as to permit one to swivel with relation to the other. This type of union is particularly useful in connection with steam pressing machines, in operation of which it is desirable that the steam conducting pipes have steam tight but swiveling connections.

In the form shown in Figure 1, the numeral 3 designates the neck into which the tubing 1 is threaded. This neck is formed with an annular flange 4 and integral therewith there is the tubular sleeve 5. The numeral 6 designates a neck into which the tube 2 is threaded and formed integral with this neck are the concentric outer and inner sleeves 7 and 8 which are spaced apart, and between which the sleeve 5 is fitted, the free ends of said concentric sleeves abutting closely against the flange 4, and the free end of the sleeve 5 abutting against the flange 9 with which the sleeves 7 and 8 are integrally formed. A nipple 10 is threaded onto the free end of the sleeve 7 and is formed with an inwardly extending annular flange 11 which fits closely over the neck 3 and abuts against the flange 4 when screwed home. It is obvious that the tube 1 when connected to the tube 2 by the connection described will be permitted to swivel relative to said last mentioned tube and at the same time a steam tight joint will be formed.

Figure 2:
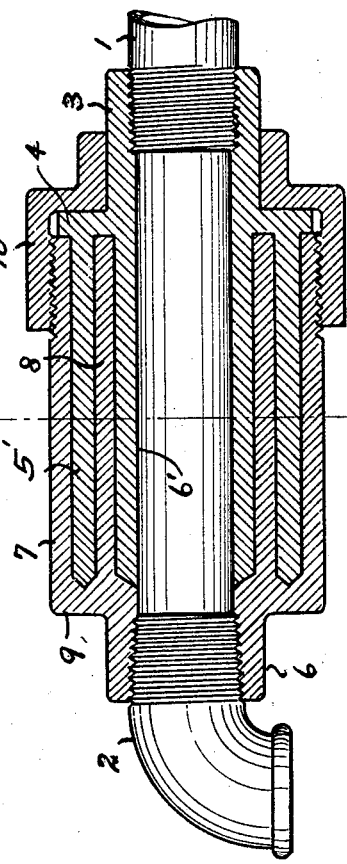
Figure 2 shows a longitudinal sectional view of another form thereof.
Figure 3:
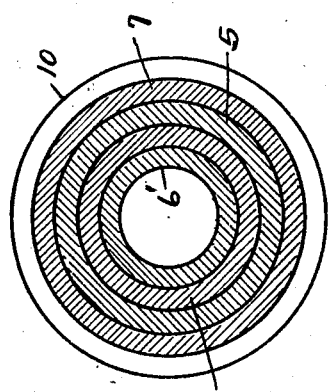
Figure 3 shows a transverse sectional view, taken on the line 3—3 of Figure 2.

In the form shown in Figures 2 and 3 the flange 4' has two concentric sleeves 5' and 6' which are formed integrally with said flange 4' and which are spaced apart and the sleeves 7 and 8, formed integrally with the flange 9, of the neck 6 intermeshing with the sleeves 5' and 6'. In this form, shown in Figure 2, the free ends of the sleeves 5' and 6' are formed with beveled faces as shown. In other respects the construction of Figures 1 and 2 are substantially similar.

What we claim is:—

A swivel union for connecting tubing comprising two nipples, each of which is provided with an internally threaded neck, an outwardly extending annular flange carried by each nipple, two relatively long concentric sleeves carried by the flange of each nipple and formed integrally therewith each sleeve being of greater length than diameter, and spaced apart, the sleeves of each nipple intermeshing with the sleeves of the other nipple, the free ends of said sleeves abutting closely against the opposing flange, and a union nut surrounding one of said necks and abutting closely against the corresponding flange and being screwed onto the outer end of the outer sleeve of the opposing nipple, said nipples being so disposed and connected to permit them to relatively turn, or swivel, on a common axis, the free end of one of said sleeves being beveled and the opposing flange having an annular groove which is formed to receive said beveled end and in which said end fits snugly.

In testimony whereof we have signed our names.

ROY E. WARREN.
FRED MELOTT.